(No Model.)

W. J. PURDY.
LOCK CLAMP FOR PIPES.

No. 389,102. Patented Sept. 4, 1888.

WITNESSES:
Phil. C. Dieterich.
C. Sedgwick.

INVENTOR,
W. J. Purdy,
BY Munn & Co.
ATTORNEY.

UNITED STATES PATENT OFFICE.

WILLIAM J. PURDY, OF NEW YORK, N. Y.

LOCK-CLAMP FOR PIPES.

SPECIFICATION forming part of Letters Patent No. 389,102, dated September 4, 1888.

Application filed April 18, 1888. Serial No. 271,041. (No model.)

*To all whom it may concern:*

Be it known that I, WILLIAM J. PURDY, of the city, county, and State of New York, have invented a new and Improved Lock-Clamp for Pipes, of which the following is a full, clear, and exact description.

My invention relates to a lock-clamp for pipes, and has for its object to provide a device that may be readily attached to and detached from a lead, wrought-iron, cast-iron, or other pipe, and has for its further object to effectually seal and close any leak or split that may occur in the said pipe.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
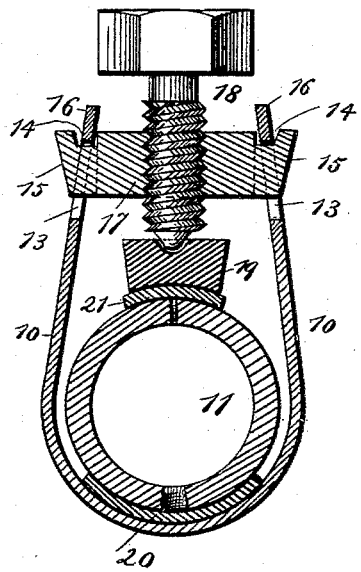
Figure 2:
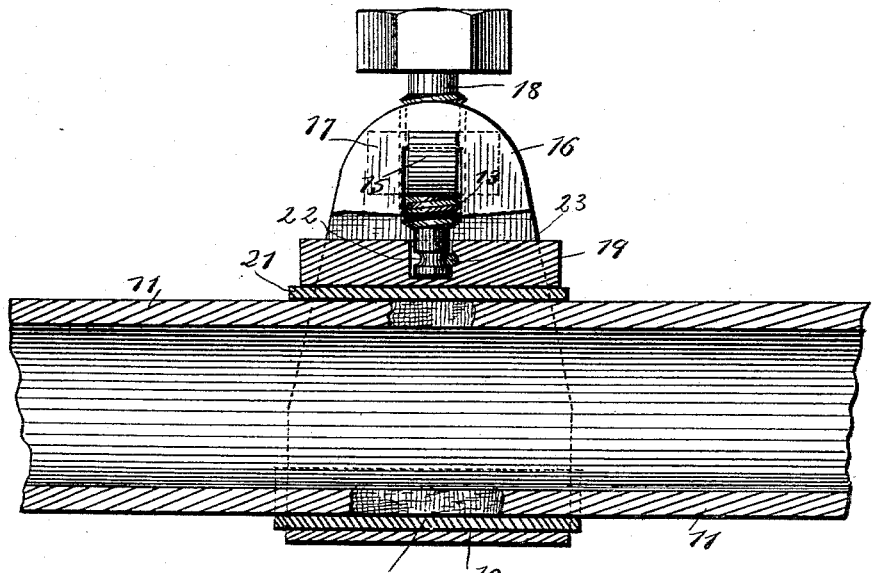

Figure 1 is a transverse section through the device applied to a pipe; and Fig. 2 is a longitudinal vertical section through Fig. 1, illustrating one member of the clamp, partially in elevation and partially in section.

In carrying out the invention the body of the clamp 10 consists of a strip of spring metal, which may be of any desired width, bent upward, essentially, in the form of a U. The under or curved portion of the body 10 is adapted for engagement with the under surface of the pipe 11, the members of said body being made to project vertically upward at each side of the said pipe, as best shown in Fig. 1. In the upper end of each member of the body 10 an aperture, 13, is produced, which apertures are made to horizontally align one another, and are preferably rectangular in contour. A yoke, 14, is provided, adapted to bind the approaching members of the body 10 at the top, which yoke consists of a block of metal having upon opposite ends integral outwardly-projecting lips 15, in the upper surface of which lips, near their engagement with the block, a transverse recess, 16, is produced. The clamp is also provided with a central threaded aperture, 17. In uniting or drawing together the opposing members of the body 10, the lips 15 are entered into the respective apertures 13, and the upper wall of the said apertures is held in contact with the lower wall of the recess 16 by means of a bolt, 18, screwed into the aperture of the yoke to a bearing upon a bed-block, 19, placed upon the upper surface of the pipe, as illustrated in Fig. 1. Prior to inserting the clamp upon the pipe, a strip of yielding or flexible material, 20, is made to intervene the split or broken surface of the pipe and the inner face of the clamp 10. The bed-block 19 is concaved upon its under face, the better to fit the contour of the pipe. Thus, when the bolt 18 is screwed downward, the said bed-block does not mar or injure the pipe in the slightest degree. The movement of the bolt 18 causes the yoke 14 to travel upward, so that the members of the clamp 10 are rigidly held in engagement with the lips of said yoke.

If a crack or flaw should occur in the pipe—for instance, at bottom and top—in addition to inserting the flexible packing 20 between the clamp and the pipe, a similar piece of packing, 21, may also be inserted between the bed-block and the pipe. Thus both leaks may be readily stopped by the same clamp.

It is always preferable in placing the clamp in engagement with the pipe to so position the clamp that the center of the curved surface of the latter will be in alignment with the break in the pipe.

I do not limit myself to the width of the clamp 10 shown, nor to the number of yokes used, as the clamp may be made wide enough to cover a leak or crack of extended length, and two or more yokes be utilized to contract the upper members of the clamp.

If in practice it be found desirable, the bed-block 19 may be provided with a recess, 22, in its upper face, and the lower end of the bolt 18 with a reduced and grooved extremity, adapted to enter the said recess, being held therein by a pin, 23, whereby the said bed-block is swiveled to the bolt; or this swiveled connection may be made in any other suitable or well-known manner.

It will be observed in the formation of the clamp-strap 10 that when the yoke is carried upward by the screw, the parts having been placed in proper position, the line of draft will be direct from the lower side of the pipe essentially vertically upward.

By using the bed-block 19, the clamp may be applied to a soft lead pipe as readily as to a wrought-iron pipe, and also may be effectually used in connection with the most brittle cast-iron pipe, as, if occasion may demand, the packing 21 may be interposed between the pipe and the bed-block to form a cushion, although no leak occur at that point.

Having thus described my invention, what I claim as new, and desire to secure by Letters Patent, is—

1. A pipe clamp consisting of an essentially U-shaped strap provided with aligning apertures in the extremities of its members, a yoke having lips extending from the end and provided with transverse recesses upon the upper face, and a bolt passing through said yoke, as and for the purpose specified.

2. A pipe-clamp consisting of an essentially U-shaped strap provided with aligning apertures in the extremities of its members, a yoke provided with lips at each end having a recessed upper face, a bed-block beneath said yoke, and a bolt passing through the yoke to engagement with said bed-block, as and for the purpose specified.

3. The combination, with a pipe and a bed-block resting upon said pipe, of an essentially U-shaped strap having the extremities of its members provided with aligning slots, a packing intervening the strap and pipe, a yoke provided with lips at each end, having their upper faces recessed and adapted to enter the slots in the strap, and a bolt passing through said yoke to engagement with the bed-block, as and for the purpose specified.

WILLIAM J. PURDY.

Witnesses:
 JAS. M. HENLEY,
 C. SEDGWICK.